United States Patent
Jeong et al.

(10) Patent No.: US 8,561,438 B2
(45) Date of Patent: Oct. 22, 2013

(54) COMPLEX WASHING MACHINE AND CONTROLLING METHOD FOR THE SAME

(75) Inventors: Seong Hae Jeong, Changwon-Si (KR); Seong Jin Jo, Changwon-Si (KR)

(73) Assignee: LG Electronics Inc., Seoul (KR)

( * ) Notice: Subject to any disclaimer, the term of this patent is extended or adjusted under 35 U.S.C. 154(b) by 556 days.

(21) Appl. No.: 12/517,870

(22) PCT Filed: Dec. 7, 2007

(86) PCT No.: PCT/KR2007/006336
§ 371 (c)(1),
(2), (4) Date: Jun. 5, 2009

(87) PCT Pub. No.: WO2008/069607
PCT Pub. Date: Jun. 12, 2008

(65) Prior Publication Data
US 2010/0307200 A1    Dec. 9, 2010

(30) Foreign Application Priority Data

Dec. 8, 2006  (KR) .................. 10-2006-0124804
Dec. 8, 2006  (KR) .................. 10-2006-0124807
Dec. 27, 2006 (KR) .................. 10-2006-0135129

(51) Int. Cl.
*D06F 31/00* (2006.01)
*D06F 37/20* (2006.01)

(52) U.S. Cl.
USPC ............... 68/13 R; 68/23.1; 68/23.3; 68/27; 68/140

(58) Field of Classification Search
USPC ...... 68/3 R, 24, 58, 140, 13 R, 23.1, 23.3, 27, 68/133
See application file for complete search history.

(56) References Cited

U.S. PATENT DOCUMENTS

| | | | | |
|---|---|---|---|---|
| 1,501,746 A * | 7/1924 | Carter | ............................ | 68/139 |
| 2,136,787 A * | 11/1938 | Dunham | ........................ | 68/23.3 |
| 2,216,388 A * | 10/1940 | Hampel | .......................... | 134/47 |
| 2,661,750 A * | 12/1953 | McNairy | ................... | 134/115 R |
| 2,667,400 A * | 1/1954 | Wotring | ......................... | 312/331 |
| 2,703,581 A * | 3/1955 | Culhane | ........................ | 134/133 |
| 2,836,046 A * | 5/1958 | Smith | ........................... | 68/23.2 |
| 2,930,215 A * | 3/1960 | Smith | ........................... | 68/23.7 |
| 2,939,465 A * | 6/1960 | Kesling | ..................... | 134/115 G |
| 2,959,966 A * | 11/1960 | Bochan | .......................... | 403/51 |
| 2,969,172 A * | 1/1961 | Hutt | ............................... | 68/23.3 |
| 2,995,023 A * | 8/1961 | Douglas | .......................... | 68/131 |

(Continued)

FOREIGN PATENT DOCUMENTS

CN    1721609 A    1/2006
GB    2 077 774 A   12/1981

(Continued)

*Primary Examiner* — Joseph L Perrin
(74) *Attorney, Agent, or Firm* — Birch, Stewart, Kolasch & Birch, LLP

(57) ABSTRACT

A complex washing machine is disclosed. The complex washing machine includes an auxiliary washing machine that is capable of serving as a pedestal for a main laundry machine, such as a washing machine or a drying machine, and performing a washing operation. The auxiliary washing machine is suitable for washing a small amount of laundry while the auxiliary washing machine serves as a pedestal for supporting the main washing machine, which is placed on the auxiliary washing machine. A bearing housing, which supports a rotary shaft of a motor, and a bottom plate of a tub are connected to each other via a gasket. Consequently, the vibration generated from the tub during washing is minimized.

19 Claims, 4 Drawing Sheets

(56) References Cited

U.S. PATENT DOCUMENTS

| | | | |
|---|---|---|---|
| 3,102,408 A * | 9/1963 | Pelensky | 68/18 FA |
| 3,139,744 A * | 7/1964 | Van Alstyne et al. | 68/20 |
| 3,527,904 A * | 9/1970 | Worst | 200/61.45 R |
| 3,550,405 A * | 12/1970 | Ziegler | 68/23.3 |
| 3,729,960 A * | 5/1973 | Skinner, II | 68/23.3 |
| 4,739,781 A * | 4/1988 | Casoli | 134/115 R |
| 5,267,456 A * | 12/1993 | Nukaga et al. | 68/12.24 |
| 5,839,097 A * | 11/1998 | Klausner | 340/12.3 |
| 5,873,269 A * | 2/1999 | Hong et al. | 68/23.7 |
| 6,474,114 B1 * | 11/2002 | Ito et al. | 68/140 |
| 6,510,716 B1 | 1/2003 | Kim et al. | |
| 6,618,887 B2 * | 9/2003 | Kim et al. | 8/158 |
| 6,727,443 B2 * | 4/2004 | Peterson et al. | 200/50.34 |
| 7,089,769 B2 * | 8/2006 | Lim et al. | 68/23.6 |
| 7,624,600 B2 * | 12/2009 | Sunshine et al. | 68/3 R |
| 2002/0042957 A1 * | 4/2002 | Kim et al. | 8/158 |
| 2004/0123631 A1 * | 7/2004 | Chang | 68/23.1 |
| 2004/0156170 A1 * | 8/2004 | Mager et al. | 361/683 |
| 2004/0189462 A1 | 9/2004 | Eilers et al. | |
| 2005/0178165 A1 | 8/2005 | Carey et al. | |
| 2005/0275325 A1 * | 12/2005 | Yang | 312/330.1 |
| 2006/0016228 A1 * | 1/2006 | Chang et al. | 68/23.1 |
| 2006/0156765 A1 | 7/2006 | Sunshine et al. | |
| 2008/0000098 A1 | 1/2008 | Choi et al. | |
| 2008/0022465 A1 * | 1/2008 | Jun et al. | 8/158 |

FOREIGN PATENT DOCUMENTS

| | | | |
|---|---|---|---|
| JP | 59-57695 A | | 4/1984 |
| JP | 61-128995 | * | 6/1986 |
| JP | 07-229184 | * | 8/1995 |
| JP | 09-122373 | * | 5/1997 |
| JP | 10-15275 A | | 1/1998 |
| JP | 10-201984 | * | 8/1998 |
| JP | 11-137893 | * | 5/1999 |
| JP | 2001-046301 | * | 2/2001 |
| JP | 2003-180605 | * | 7/2003 |
| KR | 10-0146948 B2 | | 5/1998 |
| KR | 20-0128148 Y1 | | 12/1998 |
| KR | 20-1999-0035611 U | | 9/1999 |
| KR | 2001-0059865 A | | 7/2001 |
| KR | 2001-0060631 A | | 7/2001 |
| KR | 2002-0007671 A | | 1/2002 |
| KR | 10-2005-0065721 A | | 6/2005 |
| KR | 10-2005-0115970 A | | 12/2005 |
| KR | 10-2006-0044168 A | | 5/2006 |
| KR | 701329 B1 | * | 3/2007 |
| RU | 98108420 A | | 2/2000 |
| SU | 1239182 A1 | | 6/1986 |
| SU | 1724760 A1 | | 4/1992 |
| WO | WO 2008/069607 A2 | | 6/2008 |

* cited by examiner

COMPLEX WASHING MACHINE AND CONTROLLING METHOD FOR THE SAME

TECHNICAL FIELD

The present invention relates to a complex washing machine, and more particularly, to a complex washing machine including an auxiliary washing machine that is capable of serving as a pedestal for a main laundry machine, such as a washing machine or a drying machine, and performing a washing operation.

BACKGROUND ART

Generally, laundry machines are apparatuses that are capable of washing and/or drying laundry. Specifically, each laundry machine performs a washing operation, a drying operation, or a washing-and-drying operation. Recently, there has been increasingly used a laundry machine, including a steam generator, which is capable of performing a refreshing operation to remove wrinkles, smells, and static electricity from laundry.

Based on the direction in which laundry is removed, conventional laundry machines may be classified into a front loading type laundry machine and a top loading type laundry machine. Based on the laundry washing method, on the other hand, the conventional laundry machines may be classified into a vertical-shaft type laundry machine, in which a pulsator or an inner tub is rotated, and a horizontal type laundry machine, in which a horizontally disposed drum is rotated. A representative example of the horizontal type laundry machine is a drum type washing machine or a drum type drying machine.

The sizes of the laundry machines have been gradually increased to satisfy consumers demand. Specifically, the exterior sizes of the laundry machines for home use have been gradually increased.

Generally, a large-capacity washing machine is installed in each house. Therefore, when a user sorts laundry by kind and separately washes the sorted laundry articles, it is necessary for the user to operate the washing machine several times. For example, when the user wishes to separately wash a kind of laundry, such as adult clothes, and another kind of laundry, such as underwear or child clothes, the washing machine is operated to wash the adult clothes, and, after the adult clothes are completely washed, the washing machine is operated again to wash the underwear or the child clothes. As a result, the washing time increases, and, in addition, the energy consumption increases.

Also, using the conventional large-sized washing machine to wash a relatively small amount of laundry is not preferred in an energy saving aspect. A washing course of the large-sized washing machine is generally set based on a large amount of laundry, with the result that a large amount of water is consumed. Also, it is necessary to rotate a large-sized drum or inner tub, with the result that power consumption is great. In addition, the washing course is set based on a large amount of laundry, with the result that washing time is relatively long.

On the other hand, the washing course of the large-sized washing machine is generally set to wash general clothes. As a result, the washing course of the large-sized washing machine is not suitable for washing delicate clothes, such as underwear or child clothes.

Also, the large-sized washing machine is not suitable for frequently washing a small amount of laundry. Generally, consumers collect laundry for several days or more, in order to wash all the laundry at once.

However, it is not good to leave the underwear or the child clothes unwashed for a long time. When the laundry is left unwashed for a long time, dirt adheres to the laundry, with the result that it is difficult to wash the laundry clean.

For this reason, there is a necessity for a small-sized washing machine having a capacity much smaller than that of the large-sized washing machine.

However, it is not preferred to install two washing machines side by side in one house, even though the size of the washing machines is small, in consideration of a spatial utilization aspect or a design aspect.

FIG. 1 is a perspective view illustrating a conventional laundry machine.

As shown in FIG. 1, the conventional laundry machine 1 includes a main body 10 forming the external appearance of the laundry machine and a control panel mounted at the front or the top of the main body 10. Here, the control panel may include a control unit for controlling the operation of the laundry machine. Consequently, it is possible for a user to manipulate the control panel such that the laundry machine performs a washing operation or a drying operation.

Here, the laundry machine may be a washing machine, a drying machine, or a washing-and-drying machine.

On the other hand, the conventional laundry machine may further include a pedestal 20 for supporting the main body 10 on the floor. The main body 10 is mounted on the pedestal 20.

However, the pedestal is utilized only to support the conventional washing machine or the conventional drying machine, but is not utilized for other uses.

DISCLOSURE OF INVENTION

Technical Problem

An object of the present invention devised to solve the problem lies on a new conceptional complex washing machine that is capable of washing a small amount of laundry, without the operation of a large-capacity washing machine, and serving as a pedestal for a drying machine or a washing machine.

Technical Solution

The object of the present invention can be achieved by providing a complex washing machine including an auxiliary washing machine, wherein the auxiliary washing machine includes a case for supporting another washing machine, a tub mounted in the case for storing wash water, a rotary member rotatably mounted in the tub for shaking laundry, a rotary shaft for transmitting a rotary force from a motor to the rotary member, a bearing housing for supporting the rotary shaft, and a flexible sealing member connected between the bearing housing and the tub.

Since the flexible sealing member is connected between the bearing housing, which supports the rotary shaft, and the tub, vibration transmitted to the bearing housing through the rotary shaft is prevented from being transmitted to the tub.

The case is structurally strong, enough to support a conventional washing machine or a conventional drying machine, which is placed on the case. Consequently, the case serves as a conventional pedestal.

The case may include a drawer that can be withdrawn from and inserted back into a case body. Preferably, the tub is fixedly mounted in the drawer.

More preferably, the complex washing machine further includes a top frame for covering at least a portion of the top of the drawer, the top frame being integrated with the tub.

The rotary member, which shakes the laundry, is rotatably mounted in the tub. The rotary member may be an inner tub or a pulsator.

The inner tub may be provided with a plurality of through-holes. Consequently, wash water can flow into or out of the tub through the through-holes.

The complex washing machine further includes a damping unit for supporting the bearing housing, which rotatably supports the rotary shaft.

Preferably, the motor is directly connected to the rotary shaft. More preferably, the motor is an outer rotor type motor having a stator fixed to the bearing housing.

More preferably, the motor is constructed in a concentrated wincing structure. When the motor is constructed in the concentrated winding structure, not a distributed wincing structure, the height of the motor decreases while the capacity of the motor increases.

Especially, the height of the auxiliary washing machine is small, with the result that a space below the tub, in which the motor is mounted, may be small. Therefore, it is preferable to use a motor having a small height while providing a necessary power.

Alternatively, the motor may be constructed in a double rotor type structure.

Preferably, the motor is constructed in a structure in which at least the diameter of the motor is greater than the height of the motor.

When the drawer is withdrawn from or inserted back into the case body, the tub, the rotary member, and the motor are also withdrawn from or inserted back into the case body.

The complex washing machine further includes a tub door for preventing wash water from flowing out through the top of the tub. The tub door covers an opening formed at the top of the tub.

Wash water, flowing upward by the rotation of the rotary member, such as the inner tub, is prevented from flowing out by the tub door.

The case includes a water supply valve connectable to an external pipe for water supply. A water supply pipe may be connected between the water supply pipe and the tub.

Preferably, the water supply pipe is constructed in a length-variable structure. For example, at least a portion of the water supply pipe may be made of a bellows pipe that can expand and contract in the longitudinal direction or may be constructed in a structure in which its length is telescopically variable.

In a wash water supply channel may be mounted a detergent box for supplying detergent. The wash water passes through the detergent box, with the result that the wash water is supplied into the tub together with the detergent.

Preferably, the detergent box is located at a top corner of the case.

Also, the complex washing machine further includes a drainage pipe for draining wash water. Preferably, the drainage pipe is constructed in a length-variable structure.

The water supply structure or the drainage structure is preferably located at corners in the case. For example, the water supply valve and a drainage pump may be located at corners of the case.

On the other hand, the auxiliary washing machine according to the present invention may further include a steam generator. When steam is supplied to the laundry using the steam generator, the washing effect is greatly improved.

The steam generator is preferably located at a top corner of the case.

The steam generator may be constructed in a structure in which the steam generator is connected to the water supply valve such that water is supplied to the steam generator, the water is heated, by a heater, to generate steam, and the steam is supplied into the tub. The steam generator may have the same structure as the steam generator used in the conventional washing machine.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
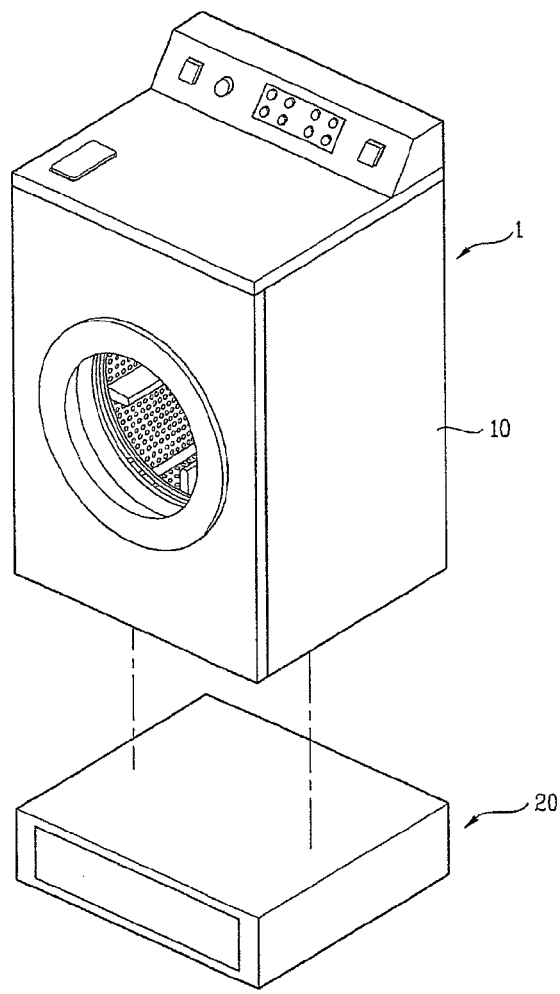
FIG. 1 is a perspective view illustrating a conventional washing machine and a pedestal.
Figure 2:
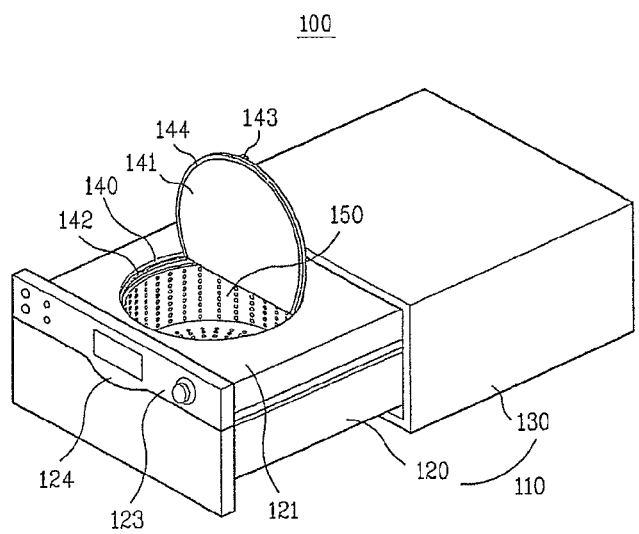
FIG. 2 is a perspective view illustrating an auxiliary washing machine according to an embodiment of the present invention.
Figure 3:
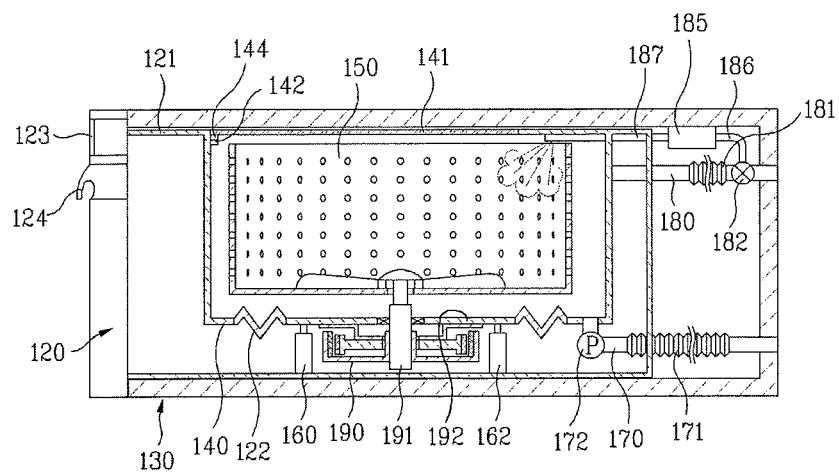
FIG. 3 is a sectional view of the auxiliary washing machine shown in FIG. 2.

As shown in FIGS. 2 and 3, an auxiliary washing machine 100 according to the present invention includes a case 110 forming the external appearance of the auxiliary washing machine.

The case 110 includes a case body 130 and a drawer 120. The drawer 120 is constructed in a structure in which the drawer 120 can be withdrawn outward from the front of the case body 120 and be inserted back into the case body 120.

The case body 130 has a size suitable for a conventional washing machine to be put thereon. Also, the case body 130 has a structural strength. In the drawer 120 is fixedly mounted an outer tub 140.

On the drawer 120 is hated a top frame 121 to cover the top of the drawer 120.

The outer tub 140 is integrated with the top frame 121.

A tub door 141 is mounted at the top opening of the outer tub 140. A door frame 142 is formed at the inner wall of the outer tub 140 such that the door frame 142 protrudes in the circumferential direction. A door sealing member 144 is mounted to the tub door 141. Consequently, when the tub door 141 is closed, the door sealing member 144 comes into contact with the door frame 142 to seal the top of the outer tub 140.

Also, a hook 143 is formed at the tub door 141. The hook 143 is inserted into a hook groove (not shown) formed at the inner wall of the outer tub 140. The hook 143 is supported by a spring (not shown) mounted in the hook groove. The end of the hook 143 is rounded, and therefore, when an appropriate force is applied to the door 141, such that the door 141 is opened or closed, the hook 143 is easily separated from or inserted into the hook groove.

The hook unit may be constructed in the forms normally used in other conventional hook units. Of course, another possible locking unit may be used instead of the hook unit.

The auxiliary washing machine 100 has a relatively small height, with the result that wash water may splash out of the outer tub 140. However, the splashing of the wash water is prevented by the provision of the tub door 141.

In the outer tub 140 is mounted an inner tub 150. The inner tub 150 is provided with a plurality of through-holes, through which wash water flows in and out. In another embodiment, the inner tub 150 may be a pulsator.

The outer tub 140 is provided at the center of a bottom plate thereof with an opening. In the opening is mounted a bearing housing 192. Between the bearing housing 192 and the bottom plate of the outer tub 140 is mounted a flexible sealing member, i.e., gasket 122.

In the bearing housing 192 is fixedly mounted a stator of a motor 190. The motor 190 is an outer rotor type motor. A rotary shaft 191 of the rotor is supported by the bearing housing 192. The rotary shaft 191 of the rotor is directly connected to the bottom of the inner tub 150.

Also, the motor 190 is constructed in a concentrated wincing structure. The diameter of the motor 190 is greater than the height of the motor 190.

To the bearing housing 192 are connected dampers 160 and 162 to support the bearing housing 192.

To the bottom of the outer tub 140 is connected a drainage pipe 170 for draining water. One end of the drainage pipe 170 is fixed to the case body 130 such that the one end of the drainage pipe 170 communicates with the outside, and the other end of the drainage pipe 170 is connected to the bottom of the outer tub 140. To the drainage pipe 170 is connected a drainage pump 172.

A portion of the drainage pipe 170 is made of a bellows pipe 171 that can expand and contract in the longitudinal direction thereof. Consequently, when the drawer 120 is withdrawn outward, the bellows pipe 171 expands.

A telescopic structure may be used instead of the bellows pipe.

To the top of the outer tub 140 is connected one end of a water supply pipe 180 for supplying water. The other end of the water supply pipe 180 is connected to a water supply valve 182. The water supply pipe 180 also includes a bellows pipe 181.

Also, a steam generator 185 is installed to supply steam into the outer tub 140. The steam generator 185 is constructed in a structure in which a water supply pipe 186 of the steam generator 185 is connected to the water supply valve 182 such that water is supplied to the steam generator 185. Steam is supplied into the outer tub 140 through a steam pipe 187.

The steam pipe 187 is constructed in a length-variable structure, such as a bellows pipe.

The steam pipe 187 has a steam outlet port, which is located above the inner tub 150 such that steam can be supplied into the inner tub 150.

The steam generator may have the same structure as the steam generator used in the conventional washing machine.

The steam generator is preferably located at the upper corner of the base 110.

Figure 4:
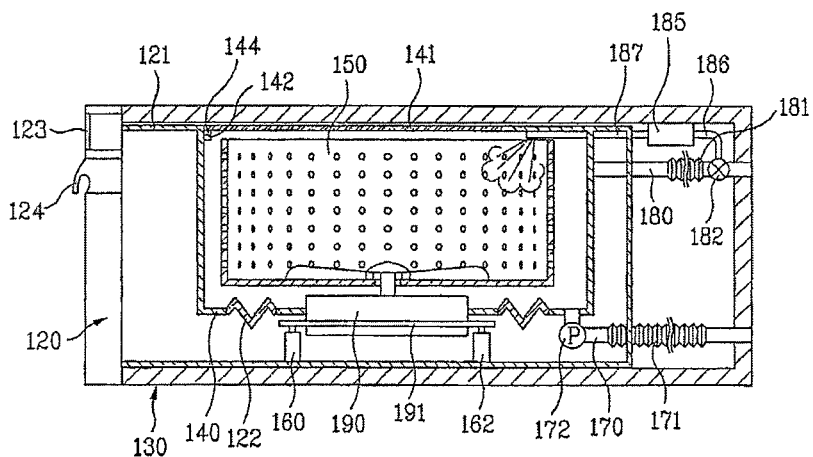
FIG. 4 is a sectional view illustrating an auxiliary washing machine according to another embodiment of the present invention.

FIG. 4 illustrates an inner rotor type motor. The rotary shaft 191 of the motor is connected to the inner tub 150. At the outer circumference of the motor is mounted a bracket 193. The dampers 160 and 162 are connected to the bracket 193.

Meanwhile, a control panel 123 is mounted at the front of the drawer 120.

Hereinafter, a controlling construction of the auxiliary washing machine according to the present invention will be described with reference to FIG. 5.

The auxiliary washing machine according to the present invention includes a control panel 123, which is independent of a main washing machine. The control panel 123 is preferably mounted at the front of the drawer 120. The control panel 123 is constructed only to control and monitor the auxiliary washing machine 100 irrespective of the main washing machine.

The control panel 123 includes various buttons and a knob as a key input unit 30 for allowing a user to input a command related to washing, such as a washing course. The control panel 123 also includes a liquid crystal display (LCD) window and a light emitting diode (LED) lamp as a display unit 60 for displaying washing information. Also, the control panel 123 includes a sound output unit 70 for generating an alarm or a voice, if necessary, depending upon the operation state of the auxiliary washing machine 100.

Also, the control panel 123 includes a control unit 80 for controlling a washing load 50, such as the motor 190, the steam generator 185, the water supply valve 182, and the drainage pump 172, constructed for the operation of the auxiliary washing machine 100.

The control panel 123 further includes a detection unit 40 for detecting the washing environment and the operation state related to the washing operation of the auxiliary washing machine 100. A signal detected by the detection unit 40 is outputted to the control unit 80.

The detection unit includes various sensors necessary for the operation, such as a water level sensor for sensing the water level of the wash water in the outer tub 140, a water temperature sensor for sensing the temperature of the wash water in the outer tub 140, a speed sensor for sensing the rotating speed of the motor 190, and a door sensor for sensing the opening and closing of the door 141.

Consequently, when a signal outputted from the key input unit 30 or the detection unit 40 is transmitted to the control unit 80, the control unit 80 controls the operation of the washing load 50, the display unit 60, and the sound output unit 70.

In addition, a locking unit (not shown) may be further included to maintain the drawer 120 inserted in the case body 130. Preferably, the locking unit is an electronic locking unit that can be controlled by the control unit 80.

Consequently, the control unit 80 controls the locking unit such that the drawer 120 cannot be withdrawn from the case body 130 while the inner tub 150 is rotated, during the washing operation. When the drawer 120 is withdrawn during the rotation of the inner tub 150, large vibrations may be generated. Consequently, the control unit 80 controls the locking unit through the detection of the rotation state of the inner tub 150. The electronic locking unit may be adopted from electronic locking units used in the conventional electric home appliances.

The rotation state of the inner tub 150 may be detected through the rotation state of the motor 190.

A user may wish to withdraw the drawer 120 during the washing operation. At this time, the control unit 80 preferably stops the operation of the inner tub and then releases the locking unit. At this time, the control unit 80 may control the display unit 60 to display the point of time when the drawer can be withdrawn after the operation of the inner tub 150 is stopped.

The control panel 123 may include a cause button for allowing the user to determine whether the drawer 120 can be withdrawn. Alternatively, it can be determined when the drawer 120 can be withdrawn by using a sensor, such as a force sensor. For example, when the user applies a force to withdraw the drawer 120, the force is sensed by the force sensor, and the control unit 80 compares the sensed force with a reference value. When the sensed force exceeds the reference value, the control unit 80 determines that the user wishes to withdraw the drawer 120.

The force sensor may be mounted in a locker groove, in which a locker of the locking unit is engaged, formed at the case body. Consequently, when the user pulls the drawer 120 to withdraw the drawer 120 from the case body, a force is applied to the force sensor mounted in the locker groove by the locker, and a signal sensed by the force sensor is transmitted to the control unit 80.

Figure 6:
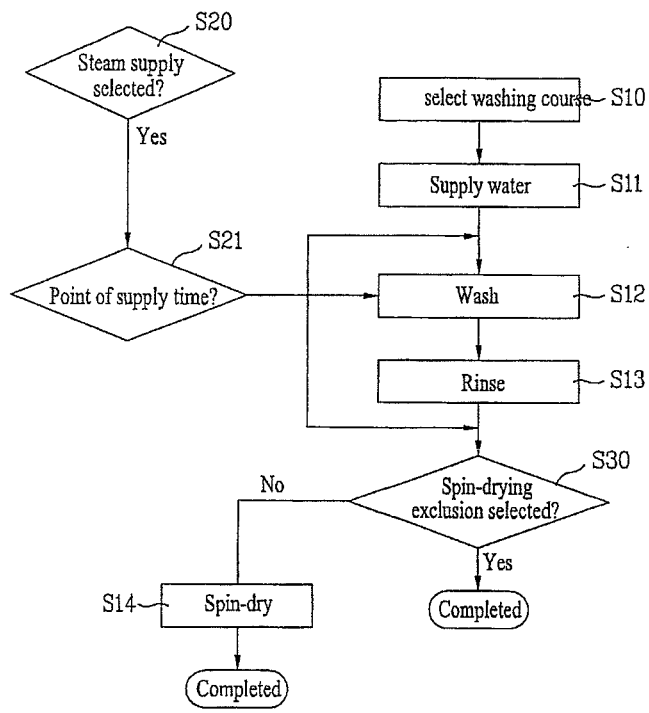
FIG. 6 is a flow chart illustrating an embodiment of a controlling method for the auxiliary washing machine.

Hereinafter, a method of using the auxiliary washing machine 100 as shown in FIG. 3 will be described with reference to FIG. 6.

First, a user withdraws the drawer 120 while holding a grip 124, opens the tub door 141, and puts laundry into the drawer 120.

After the laundry is put into the drawer 120, the user inserts the drawer 120 into the case body 120, and selects an option related to washing, such as a washing course, through the control panel 123 (S10).

Figure 5:
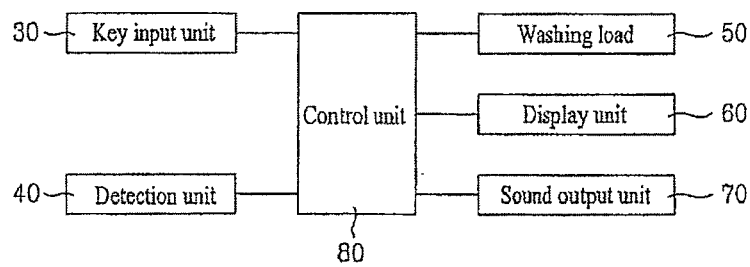
FIG. 5 is a control block diagram of the auxiliary washing machine.

When the user presses a start button to command the commencement of the washing operation, the control unit 80 controls the related components to perform a washing course according to steps of FIG. 5.

First, the control unit 80 opens the water supply valve 182 to supply wash water (S11).

After the completion of the water supply, the control unit 80 controls the motor 190 to rotate the inner tub 150 such that the washing is performed (S12).

After the completion of the washing, water is resupplied to rinse the laundry (S13).

At this time, the control unit 80 determines where the washing course is selected such that a spin-drying step is excluded (S30). When the washing course is selected such that the spin-drying step is excluded, the washing course is completed after the rinsing step is completed. On the other hand, when the washing course is selected such that the spin-drying step is not excluded, the inner tub 150 is rotated at a high speed, after the rinsing step is completed, to perform the spin-drying step (S14), and then the washing course is completed.

The auxiliary washing machine 100 according to this embodiment may be used to wash toys in addition to the laundry. In this case, the spin-drying step may be excluded.

To this end, the key input unit 30 of the control panel 123 may include a unit for a user to select a washing course excluding a spin-drying step. For example, a washing course including a spin-drying step or a washing course excluding a spin-drying step may be selected. FIG. 6 illustrates that the control panel 123 includes a spin-drying step exclusion button. Consequently, when the user selects the washing course, and presses the spin-drying step exclusion button, the spin-drying step is excluded from the washing course.

Also, the washing course may include a step of supplying steam.

A unit for inducing the steam supply step in the washing course may be included in the control panel 123. For example, the control panel 123 may include a steam supply button. In this case, when the user selects the washing course, and presses the steam supply button, as shown in FIG. 6, the steam supply step is included in the washing course (S20).

The steam supply step may be performed to soak the laundry before the commencement of the washing step. Alternatively, the steam supply step may be performed, during the progression of the washing step, to improve the washing effect.

The steam supply step may be used to sterilize the laundry. At this time, a predetermined amount of steam is supplied and maintained for a predetermined period of time such that the sterilizing effect is achieved.

Preferably, the sterilization using the steam is performed after the completion of the rinsing step or after the completion of the spin-drying step.

A selection unit for allowing the user to select when the steam is to be supplied may be included in the control panel 123. For example, the steam supply button may be formed in the shape of a knob such that options, such as before washing, during washing, and after washing, may be further selected by the rotation of the knob. The control unit 80 determines the point of time when the steam is to be supplied depending upon the selection of the user (S21).

At the washing step, the inner tub 150 is rotated in alternating directions such that the laundry is tumbled.

Alternatively, the inner tub 150 is rotated, such that the wash water is formed in the shape of a V, at the washing step. At this time, the inner tub 150 is rotated at a speed higher than the former case.

In another case, the washing step may be performed such that a centrifugal transmission washing is possible. At this time, the inner tub 150 is rotated at a higher rotating speed. The wash water in the inner tub 150 is transmitted through the laundry by the centrifugal force, and flows out of the inner tub 150 through the through-holes of the inner tub 150.

Figure 7:
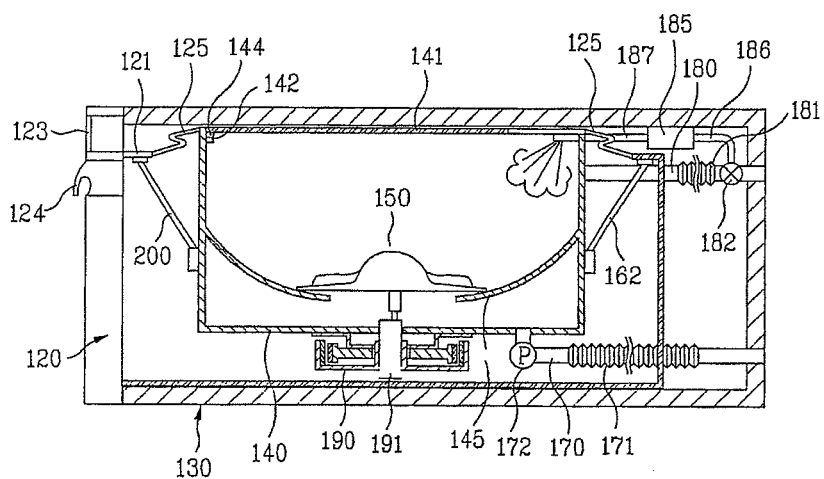
FIG. 7 is a vertical sectional view illustrating an auxiliary washing machine according to a further embodiment of the present invention.
Figure 8:
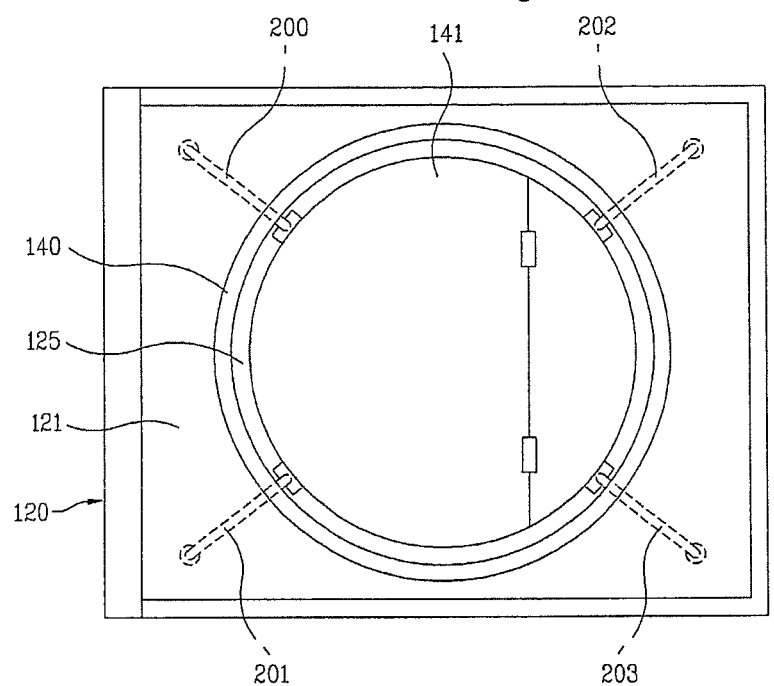
FIG. 8 is a horizontal sectional view of the auxiliary washing machine shown in FIG. 7.
Figure 9:
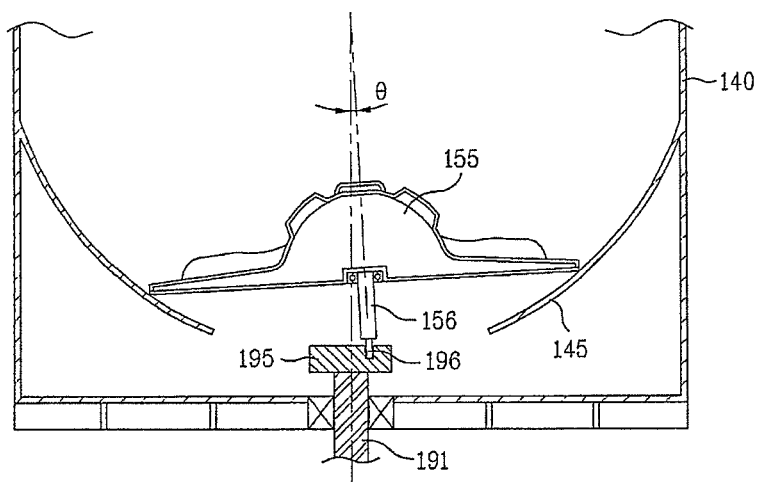
FIG. 9 is a sectional view illustrating the coupling between a tub and a rotary shaft of the auxiliary washing machine shown in FIG. 7.

FIGS. 7 to 9 illustrate an auxiliary washing machine according to another embodiment of the present invention.

Components of the auxiliary washing machine according to this embodiment which are identical to those of the auxiliary washing machine according to the previous embodiment will be indicated by the same reference numerals, and a description thereof will not be given.

As shown in FIGS. 7 and 8, an outer tub 140 is mounted in a drawer 120 in a supported structure. To support the outer tub 140, as shown in FIG. 8, a first supporting unit 200, a second supporting unit 202, a third supporting unit 201, and a fourth supporting unit 203 are located at four corners of a case 110.

The supporting units may be constructed in the same structure as the supporting unit for supporting the outer tub 140 in the conventional vertical shaft type washing machine.

One end of each supporting unit is connected to each corner of a top frame 121 covering the top of the drawer 120. The other end of each supporting unit is connected to the side wall of the outer tub 140.

The top of the outer tub 140 is connected to the top frame 121 via a flexible sealing member, i.e., a gasket 125. The top frame 121 and the gasket 125 prevent foreign matter, including water, from entering a gap defined between the outer tub 140 and the drawer 120.

The gasket 125 is flexible, and therefore, vibration generated from the outer tub 140 is not transmitted to the top frame 121.

A tub door 141 is mounted in the top opening of the outer tub 140. A door frame 142 is formed at the inner wall of the outer tub 140 such that the door frame 142 protrudes in the circumferential direction. A door sealing member 144 is mounted to the tub door 141. Consequently, when the tub door 141 is closed, the door sealing member 144 comes into contact with the door frame 142 to seal the top of the outer tub 140.

The auxiliary washing machine 100 has a relatively small height, with the result that wash water may splash out of the outer tub 140. However, the splashing of the wash water is prevented by the provision of the tub door 141.

In the outer tub 140 is mounted a pulsator as shown in FIG. 9. The pulsator is mounted in a wobbling fashion.

As shown in FIG. 9, the outer tub 140 includes a concave guide 145. To the pulsator is connected a pulsator shaft 156 by a bearing. The end of the pulsator 156 is inserted into a groove 196 formed at an extension part 195, which is located on a rotary shaft 191 of a motor 190. The groove 196 is located such that the groove 196 is eccentric, by a predetermined distance, from the center of the extension part 195.

Consequently, as the motor 190 is rotated, the pulsator 155 is wobbled within the range of an angle θ while the end of the pulsator 155 is in contact with the guide 145.

The motor 190 is fixedly mounted to the outer bottom of the outer tub 140. The motor 190 is an outer rotor type motor. A stator of the motor 190 is fixedly mounted to the outer bottom of the outer tub 140. A rotary shaft 191 of the rotor is directly connected to the bottom of the pulsator 155 through the bottom of the outer tub 140.

At the bottom of the tub 140 is mounted a bearing for supporting the rotary shaft 191.

Also, the motor 190 is constructed in a concentrated winding structure. The diameter of the motor 190 is greater than the height of the motor 190.

The steam generator may have the same structure as the steam generator used in the conventional washing machine.
Industrial Applicability As apparent from the above description, the auxiliary washing machine according to the present invention is capable of supporting the main washing machine, which is placed on the auxiliary washing machine, and is suitable for washing a small amount of laundry.

Also, the auxiliary washing machine according to the present invention is capable of washing a small amount of laundry, without using a large-sized washing machine, thereby saving energy. Furthermore, the auxiliary washing machine according to the present invention is capable of supporting a large-sized washing machine or a large-sized drying machine. Consequently, the auxiliary washing machine according to the present invention is not limited in an installation space aspect.

In addition, the auxiliary washing machine according to the present invention can be used together with the main washing machine to simultaneously wash sorted laundry articles.

The invention claimed is:

1. A washing machine comprising:
    a main washing machine for performing a washing or drying operation; and
    an auxiliary washing machine,
    wherein the auxiliary washing machine includes:
        a case for stably supporting the main washing machine, the case having a volume and height less than that of the main washing machine;
        a drawer configured to be forwardly extracted from and retracted into the case;
        an outer tub mounted in the drawer for storing wash water and having an opening formed in a central portion of a lower surface thereof;
        an inner tub rotatably mounted in the outer tub for shaking laundry;
        a bearing housing located inside of the opening of the tub, the bearing housing having an outer circumferential surface spaced from the inner circumferential surface of the opening of the outer tub by a predetermined distance;
        a motor fastened to a lower surface of the bearing housing, for providing a rotary force to the inner tub;
        a rotary shaft rotatably supported by the bearing housing and coupled to the inner tub through the bearing housing, for transmitting the rotary force from the motor to the inner tub;
        a damping unit for supporting the bearing housing and attenuating vibrations delivered from the motor or the inner tub to the bearing housing; and
        a first flexible sealing member configured to seal the opening in the outer tub and connected between the bearing housing and the outer tub so that the bearing housing vibrates independently of the outer tub, the first flexible sealing member attenuating vibrations of the bearing housing delivered to the outer tub.

2. The washing machine according to claim 1, further comprising:
    a top frame for covering at least a portion of the top of the drawer, the top frame being integrated with the outer tub.

3. The washing machine according to claim 2, wherein the motor includes a stator fixed to the bearing housing.

4. The washing machine according to claim 3, wherein the motor is constructed in a structure in which the diameter of the motor is greater than the height of the motor.

5. The washing machine according to claim 1, further comprising:
    a door for covering the top of the outer tub.

6. The washing machine according to claim 1, further comprising:
    a supporting unit having one end connected to the top or bottom of the drawer and the other end connected to the outer tub.

7. The washing machine according to claim 6, wherein the supporting unit includes:
    a first supporting unit;
    a second supporting unit;
    a third supporting unit; and
    a fourth supporting unit connected to top corners or bottom corners of the drawer, respectively.

8. The washing machine according to claim 1, further comprising:
    a water supply pipe connected to the outer tub,
    wherein the water supply pipe is constructed in a length-variable structure.

9. The washing machine according to claim 1, further comprising:
    a drainage pipe connected to the outer tub, wherein the drainage pipe is constructed in a length-variable structure.

10. The washing machine according to claim 1, further comprising:
    a steam generator for supplying steam into the outer tub.

11. The washing machine according to claim 1, further comprising:
    a second flexible sealing member for sealing a space defined between the top of the outer tub and the case.

12. The washing machine according to claim 1, further comprising:
    a top frame for covering at least a portion of the top of the drawer; and
    a third flexible sealing member connected between the top of the outer tub and the top frame.

13. The washing machine according to claim 1, wherein the auxiliary washing machine performs a washing operation in the outer tub under the control independent of the main washing machine.

14. The washing machine according to claim 13, wherein the auxiliary washing machine further includes a control panel for controlling the overall procedure related to the washing operation.

15. The washing machine according to claim 14, wherein the control panel includes:
- a key input unit for allowing a user to input a command;
- a detection unit for detecting the washing environment and the operation state related to the washing operation; and
- a control unit for controlling the procedure related to the washing operation based on information inputted through the key input unit or the detection unit.

16. The washing machine according to claim 15, wherein the detection unit includes at least one selected from a group comprising
- a water level sensor for sensing the water level of the wash water in the outer tub;
- a water temperature sensor for sensing the temperature of the wash water in the outer tub;
- a speed sensor for sensing the rotating speed of the motor; and
- a door sensor for sensing the opening and closing of the door that covers the top of the outer tub.

17. The washing machine according to claim 15, wherein the control panel further includes a display unit for displaying the washing operation condition or the operation state inputted by the user under the control of the control unit.

18. The washing machine according to claim 15, wherein the control panel further includes a sound output unit for generating an alarm or a voice, depending upon the operation state, under the control of the control unit.

19. The washing machine according to claim 1, further comprising:
- a top frame for covering at least a portion of the top of the drawer; and
- a tub door formed in the top frame.

* * * * *